United States Patent
Oulès et al.

(10) Patent No.: US 11,190,726 B1
(45) Date of Patent: Nov. 30, 2021

(54) LOOPING PRESENTATION OF VIDEO CONTENT

(71) Applicant: GoPro, Inc., San Mateo, CA (US)

(72) Inventors: Guillaume Oulès, Bordeaux (FR); Guillaume Abbe, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/132,411

(22) Filed: Dec. 23, 2020

(51) Int. Cl.
  *H04N 5/783* (2006.01)
  *H04N 21/439* (2011.01)
  *G06K 9/00* (2006.01)
  *H04N 21/845* (2011.01)

(52) U.S. Cl.
  CPC ......... *H04N 5/783* (2013.01); *G06K 9/00751* (2013.01); *H04N 21/4394* (2013.01); *H04N 21/845* (2013.01)

(58) Field of Classification Search
  USPC ............... 386/239–248, 278–290, 343–352
  See application file for complete search history.

(56) References Cited

U.S. PATENT DOCUMENTS

| 9,992,470 B1* | 6/2018 | Hofmann | H04N 5/77 |
| 2020/0251146 A1* | 8/2020 | St. John Brislin | G11B 27/036 |
| 2021/0029410 A1* | 1/2021 | Huang | H04N 21/4316 |

* cited by examiner

*Primary Examiner* — Hung Q Dang
(74) *Attorney, Agent, or Firm* — Esplin & Associates, PC

(57) ABSTRACT

A highlight moment within a video, music to accompany a looping presentation of the video, and a looping effect for the video may be determined. A segment of the video to be used for the looping presentation of the video may be selected based on highlight moment, the music, and the looping effect. The looping presentation of the video may be generated to have the segment edited based on a style of the looping effect and to include accompaniment of the music.

16 Claims, 5 Drawing Sheets

LOOPING PRESENTATION OF VIDEO CONTENT

FIELD

This disclosure relates to generation of a looping presentation of video content.

BACKGROUND

A user may wish to create a looping video clip of a video. The looping video clip may include a repeating view of a video segment. Determining the amount and which segment of the video should be included in the looping video clip may be difficult, complicated, and unintuitive.

SUMMARY

This disclosure relates to generation of a looping presentation of video content. Video information and/or other information may be obtained. The video information may define video content having a video progress length. A highlight moment within the video progress length of the video content may be determined. Music to provide accompaniment for a looping presentation of the video content may be determined. The music may have a music progress length. A looping effect for the video content may be determined. The looping effect may define a style of video edit to be applied to the video content for the looping presentation of the video content. A segment of the video content to be used for the looping presentation of the video content may be selected based on the music progress length of the music, the highlight moment within the video progress length of the video content, the looping effect for the video content, and/or other information. The looping presentation of the video content may be generated based on the segment of the video content, the looping effect for the video content, and/or other information. The looping presentation of the video content may have the music progress length. The looping presentation of the video content may include the segment of the video content edited based on the style of video edit defined by the looping effect. The looping presentation of the video content may include accompaniment of the music.

A system that generates a looping presentation of video content may include one or more electronic storage, processor, and/or other components. The electronic storage may store video information, information relating to video content, information relating to highlight moment, information relating to music, information relating to a looping effect, information relating to a segment of the video content, information relating to a looping presentation of the video content, and/or other information.

The processor(s) may be configured by machine-readable instructions. Executing the machine-readable instructions may cause the processor(s) to facilitate generating a looping presentation of video content. The machine-readable instructions may include one or more computer program components. The computer program components may include one or more of a video information component, a highlight component, a music component, a looping effect component, a segment component, a generation component, and/or other computer program components.

The video information component may be configured to obtain video information and/or other information. The video information may define video content. The video content may have a video progress length.

The highlight component may be configured to determine a highlight moment within the video progress length of the video content. The highlight moment may be determined based on user selection, analysis of the video content, and/or other information. In some implementations, the highlight moment may include a single highlight point within the video progress length.

The music component may be configured to determine music to provide accompaniment for a looping presentation of the video content. The music may have a music progress length.

The looping effect component may be configured to determine a looping effect for the video content. The looping effect may define a style of video edit to be applied to the video content for the looping presentation of the video content. In some implementations, location of the highlight moment within the looping presentation of the video content may be determined based on the looping effect for the video content.

The segment component may be configured to select a segment of the video content to be used for the looping presentation of the video content. The segment of the video content may be selected based on the music progress length of the music, the highlight moment within the video progress length of the video content, the looping effect for the video content, and/or other information.

The generation component may be configured to generate the looping presentation of the video content based on the segment of the video content, the looping effect for the video content, and/or other information. The looping presentation of the video content may have the music progress length. The looping presentation of the video content may include the segment of the video content edited based on the style of video edit defined by the looping effect. The looping presentation of the video content may include accompaniment of the music.

In some implementations, responsive to the highlight moment being within a threshold duration of an end of the segment of the video content, the looping presentation of the video content may include a reverse playback of one or more portions of the segment of the video content.

In some implementations, responsive to the segment of the video content being shorter than the music progress length, the looping presentation of the video content may include a reverse playback of one or more portions of the segment of the video content.

In some implementations, the looping presentation of the video content may not include a speed effect that changes perceived playback speed of the video content based on the segment of the video content being shorter than the music progress length. In some implementations, the looping presentation of the video content may include the speed effect that changes the perceived playback speed of the video content based on the looping effect for the video content.

In some implementations, the looping presentation of the video content may be encoded to include a selected number of loops. In some implementations, the number of loops may be selected based on a platform on which the encoded looping presentation of the video content is to be uploaded, and/or other information.

In some implementations, the highlight moment, the music, and/or the looping effect is determined based on user selection. The user selection may be received through user interaction with a user interface.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
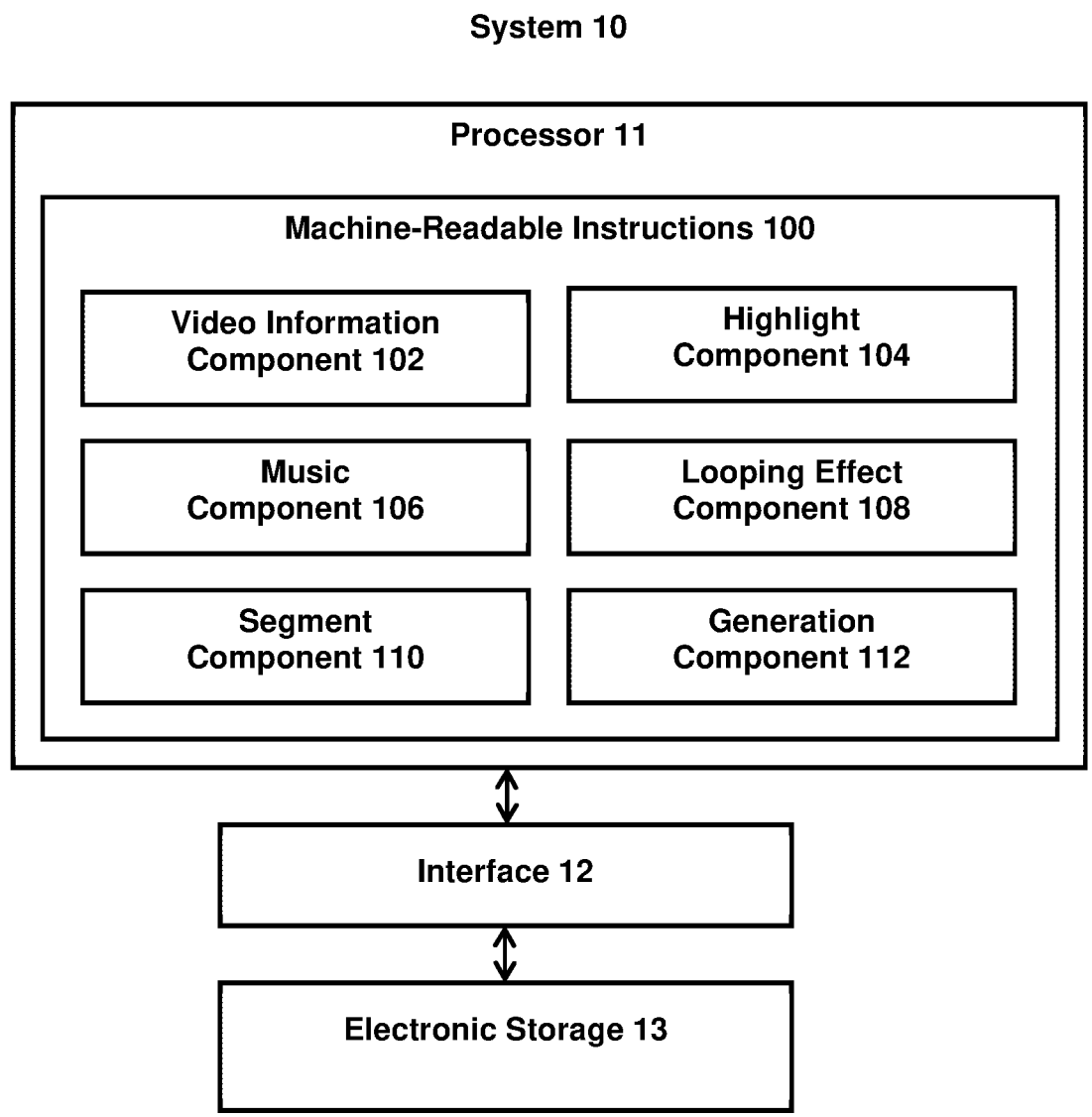
FIG. 1 illustrates a system that generates a looping presentation of video content.

FIG. 1 illustrates a system 10 that generates a looping presentation of video content. The system 10 may include one or more of a processor 11, an interface 12 (e.g., bus, wireless interface), an electronic storage 13, and/or other components. Video information and/or other information may be obtained by the processor 11. The video information may define video content having a video progress length. A highlight moment within the video progress length of the video content may be determined by the processor 11. Music to provide accompaniment for a looping presentation of the video content may be determined by the processor 11. The music may have a music progress length. A looping effect for the video content may be determined by the processor 11. The looping effect may define a style of video edit to be applied to the video content for the looping presentation of the video content. A segment of the video content to be used for the looping presentation of the video content may be selected by the processor 11 based on the music progress length of the music, the highlight moment within the video progress length of the video content, the looping effect for the video content, and/or other information. The looping presentation of the video content may be generated by the processor 11 based on the segment of the video content, the looping effect for the video content, and/or other information. The looping presentation of the video content may have the music progress length. The looping presentation of the video content may include the segment of the video content edited based on the style of video edit defined by the looping effect. The looping presentation of the video content may include accompaniment of the music.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to video content, information relating to highlight moment, information relating to music, information relating to a looping effect, information relating to a segment of the video content, information relating to a looping presentation of the video content, and/or other information.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate generating a looping presentation of video content. The machine-readable instructions 100 may include one or more computer program components. The machine-readable instructions 100 may include one or more of a video information component 102, a highlight component 104, a music component 106, a looping effect component 108, a segment component 110, a generation component 112, and/or other computer program components.

The video information component 102 may be configured to obtain video information and/or other information. Obtaining video information may include one or more of accessing, acquiring, analyzing, determining, examining, identifying, loading, locating, opening, receiving, retrieving, reviewing, selecting, storing, and/or otherwise obtaining the video information. The video information component 102 may obtain video information from one or more locations. For example, the video information component 102 may obtain information from a storage location, such as the electronic storage 13, electronic storage of information and/or signals generated by one or more sensors, electronic storage of a device accessible via a network, and/or other locations. The video information component 102 may obtain information from one or more hardware components (e.g., an image sensor, a sound sensor) and/or one or more software components (e.g., software running on a computing device).

In some implementations, the video information component 102 may obtain video information based on user interaction with a user interface/application (e.g., video editing application, video player application), and/or other information. For example, a user interface/application may provide option(s) for a user to generate looping videos. The video information defining the video(s) may be obtained based on the user's selection of the video(s) through the user interface/video application. Other selections of video for retrieval of video information are contemplated.

The video information may define video content. The video content may have a video progress length. The video information may define a video by including information that defines one or more content, qualities, attributes, features, and/or other aspects of the video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

In some implementations, the video content may include spherical video content. The field of view of the visual content of spherical video content may include a spherical field of view. Spherical field of view may include full spherical field of view (360 degrees of capture) or partial spherical field of view (less than 360 degrees of capture). The visual content may be viewable from a point of view as the function of progress through the progress length. Spherical video content may include and/or may be associated with spatial sounds.

Video information may be stored within a single file or multiple files. For example, video information defining video content may be stored within a video file, multiple video files, a combination of different files (e.g., a visual file and an audio file), and/or other files. Video information may be stored in one or more formats or containers. A format may refer to one or more ways in which the information defining a video is arranged/laid out (e.g., file format). A container may refer to one or more ways in which information defining a video is arranged/laid out in association with other information (e.g., wrapper format).

Figure 3:
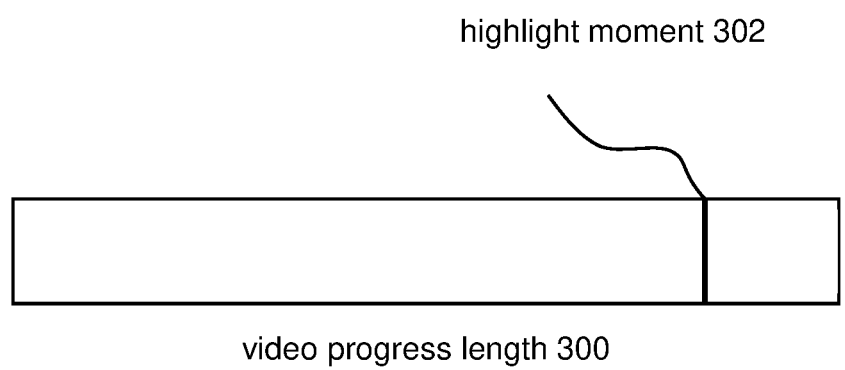
FIG. 3 illustrates an example highlight moment within a video progress length.

The highlight component 104 may be configured to determine one or more highlight moments within the video progress length of the video content. A highlight moment refer to a moment at which a highlight event occurs. A highlight event may refer to an exciting, interesting, and/or an important event, such as a high point or a climax of an activity being performed by one or more persons. A highlight event may refer to an event marked by a user as being important. A highlight event may be an event of interest. In some implementations, a highlight moment may include a single highlight point within the video progress length. That is, a highlight moment may refer to a single point in time within the video progress length. FIG. 3 illustrates an example highlight moment 302 within a video progress length 300.

Determining a highlight moment within the video progress length of the video content may include ascertaining, choosing, establishing, finding, identifying, obtaining, selecting, setting, and/or otherwise determining the highlight moment. A highlight moment within the video progress length of the video content may be determined based on user selection, analysis of the video content, and/or other information. User selection of a highlight moment may refer to user input that identifies/designates a moment within the video progress length as the highlight moment. Analysis of the video content may include analysis of the visual content (e.g., content of video frames), such as based on blur detection, color analysis, face recognition, histogram analysis, object recognition, activity recognition, scene recognition, salience detection, emotion recognition, and/or other analysis of the visual content. Analysis of the video content may include analysis of the audio content (e.g., recorded sound), such as based on voice recognition, command recognition, activity recognition, emotion detection, and/or other analysis of the audio content. Analysis of the video content may include analysis of metadata (e.g., telemetry data, GPS data, IMU data, speed data, velocity data, acceleration data, rotation data, user-designated highlight data) of the video content, such as based on motion of the image capture device indicating occurrence of highlight moment/event and/or based on user interaction with a highlight button of the image capture device. Other determination of the highlight moment is contemplated.

The music component 106 may be configured to determine music to provide accompaniment for a looping presentation of the video content. The music may include vocal and/or instrumental sounds. The music may have a music progress length (e.g., song duration). The music progress length may be same as or different from the video progress length. The music progress length may be shorter than or longer than the video progress length. The music may provide accompaniment for entirety or one or more portions of the looping presentation of the video content.

Determining music to provide accompaniment for a looping presentation of the video content may include ascertaining, choosing, establishing, finding, identifying, obtaining, selecting, setting, and/or otherwise determining the music. The music to provide accompaniment for a looping presentation of the video content may be determined based on user selection, analysis of the video content, and/or other information. User selection of the music may refer to user input that selects particular music as the music that will provide accompaniment for the looping presentation of the video content. For example, user selection of particular may be received via user interaction with one or more options presented on a user interface. Analysis of the video content to determine the music may include determining particular music as the music to provide accompaniment based on analysis of the visual content, audio content, metadata, and/or other information relating to the video content. For example, different patterns within the video content may be associated with different music, and music matching the pattern detected within the video content may be selected to provide accompaniment for a looping presentation of the video content. Other determination of music is contemplated.

The looping effect component 108 may be configured to determine a looping effect for the video content. A looping effect may refer to an effect to be applied and/or created within a looping presentation of the video content. A looping effect may refer to changes to be made to the video content in generating a looping presentation of the video content. A looping effect may change visual characteristics, audio characteristics, and/or timing characteristics of the video content.

For example, a looping effect may change how visual content is presented within a looping presentation of the video content. A looping effect may change how audio content is played back within a looping presentation of the video content. A looping effect may change the perceived speed and/or ordering with which video content is played back within a looping presentation of the video content.

A looping effect may define a style of video edit to be applied to the video content for the looping presentation of the video content. Video edit may refer to changes to the video content. A style of video edit may refer to a particular manner of making changes to the video content. Video edit may include usage of one or more of speed ramps, freeze frames, video frame/portion repetition, reverse playback, filters, overlays, compositing, transformations (e.g., mirror, zoom, etc.), transition, segmentation, strobing, and/or other edits/effects.

In some implementations, a user may be presented with options to select from a list of effects. Example effects listed within the list of effects may include basic effect, beat effect, boomerang effect, repeat effect, repeat mirror effect, repeat zoom effect, rewind effect, freeze effect, ghost effect, shuffle effect, ping-pong effect, stutter effect, segmentation effect, and/or other effect.

The basic effect may include selection of a segment of the video content based on the music progress length of the music. The segment of the video content that is selection may be the same length as the music progress length of the music. The looping presentation of the video content may include repeated playback of the segment of the video content with the music.

The beat effect may include repeated playback of the visual content with one or more visual effects. The usage of visual effects (e.g., changes to one or more visual characteristics of the visual content) within looping presentation of the video content may be determined based on beat of the music. The visual effect may be repeatedly applied at every beat of the music or at multiples of the beat (e.g., every other beat, every third beat). For example, color overlays, frame shaking, visual warping, and/or other visual effects may be applied at every beat of the music.

The boomerang effect may include repeated playback of the visual content in forward and reverse playback direction. Timing of when the playback switches from forward playback to reverse playback, and/or vice versa, may be determined based on beat of the music. The switch in playback direction may be performed at every beat or at multiples of beat. For example, the boomerang effect may include repeats of playback in forward direction for a certain number of beats (one beat, two beats, four beats), followed by playback in reverse direction for the same number of beats (one beat, two beats, four beats).

The repeat effect may include repeated playback of the visual content in one direction (e.g., forward direction, reverse direction). The amount of visual content included in the repeats may be determined based on beat of the music. The amount of visual content included in the repeats may match one beat or multiples of beat. For example, the repeat effect may include repeats of a length of video that matches/extends a certain number of beats (e.g., two beats).

The repeat mirror effect may include repeated playback of the visual content in one direction (e.g., forward direction, reverse direction) with mirroring effect. The mirroring effect may include the visual content flipped in a direction (e.g., horizontally flipped, vertically flipped). The amount of visual content included in the repeats may be determined based on beat of the music. The amount of visual content included in the repeats may match one beat or multiples of beat. For example, the repeat mirror effect may include repeats of a length of video that matches/extends a certain number of beats (e.g., two beats). The mirroring effect may be applied every other repeats (e.g., no mirroring effect for the first loop, mirroring effect for the second loop, no mirroring effect for the third loop, mirroring effect for the fourth loop).

The repeat zoom effect may include repeated playback of the visual content in one direction (e.g., forward direction, reverse direction) with zooming effect. The mirroring effect may include zooming in and out of the visual content (e.g., linear zoom, exponential zoom). The amount of visual content included in the repeats may be determined based on beat of the music. The amount of visual content included in the repeats may match one beat or multiples of beat. For example, the repeat zoom effect may include repeats of a length of video that matches/extends a certain number of beats (e.g., two beats). The zooming effect may be applied to zoom in and out within a single loop. For example, the zooming effect may be at the beginning and at the end of the loop (e.g., zoom in at the beginning of the loop and zoom out at the end of the loop).

The rewind effect may include repeated playback of the visual content in forward and reverse playback direction. The perceived speed with which the visual content is played back in the forward direction may be different from the perceived speed with which the visual content is played back in the reverse direction. Timing of when the playback switches from forward playback to reverse playback, and/or vice versa, may be determined based on beat of the music. The switch in playback direction may be performed at a particular beat within a loop. For example, a loop may consist of eight beats, and the rewind effect may include repeats of playback in the forward direction for a certain number of beats (e.g., six beats), followed by playback in the reverse direction for the remaining number of beats in the loop (e.g., two beats). The playback in the reverse direction may be sped-up/slowed-down to bring the playback back to the beginning of the loop. For instance, based on the six-beat forward playback at normal speed (1× speed), the two-beat reverse playback may be performed at three-times speed (3× speed).

The freeze effect may include repeated playback of the visual content with a particular video frame frozen during the loop. The video frame that is selected for freeze may be determined based on beat of the music. For example, a loop may consist of eight beats, and the freeze effect may include the video frame at the sixth beat frozen for a duration (e.g., for a beat) within the loop.

The ghost effect may include repeated playback of the visual content with video frames blended during the loop. The video frames that are selected for blending may be determined based on beat of the music. For example, a maximum-minimum blending may be used to freeze video frames every two beats. That is, for every two beats, video frames may be extracted and blending using maximum-minimum averaging.

The shuffle effect may include repeated playback of the visual content with different lengths of the visual content divided into slices and shuffled within the loop. The lengths of the visual content that are divided into slices may be determined based on beat of the music. For example, individual slices may make up one-beat worth of visual content, and the slices may be shuffled (e.g., randomly ordered) for presentation within the loop.

The ping-pong effect may include repeated playback of the visual content with the loop including back-and-forth presentation (jump cut) of different slices of the visual content. The lengths of the visual content that are divided into slices may be determined based on beat of the music. For example, a loop may consist of eight beats, and individual slices may make up two-beat worth of visual content. The loop may begin with the first slice, followed by the third slice, followed by the second slice, and then followed by the fourth slice.

The stutter effect may include repeated playback of the visual content with one or more stuttering effects. A suffering effect may include the playback of the visual content going back (e.g., by a fraction of a beat) to cause appearance of stuttering within the presentation. The location within the loop at which stuttering is simulated may be determined based on beat of the music. For example, a suffering effect may be applied at every beat or at multiples of beat.

The segmentation effect may include repeated playback of the visual content with the visual content segmented into two or more segments. Segmentation may include separation/isolation of pixels depicting a particular thing from pixels depicting other things. For example, segmentation may include separation/isolation of pixels depicting a person from pixels depicting other things. Visual effect (e.g., zoom in/out, color change, warping) may be applied to one or more of the segments. The location within the loop at which segmentation (and visual effect) is performed may be determined based on beat of the music. For example, segmentation (and visual effect) may be applied at every beat or at multiples of beat.

Determining a looping effect for the video content may refer to ascertaining, choosing, establishing, finding, identifying, obtaining, selecting, setting, and/or otherwise determining the looping effect. The looping effect for the video content may be determined based on user selection, analysis of the video content, and/or other information. User selection of the looping effect may refer to user input that selects a particular looping effect as the looping effect to be used in generating the looping presentation of the video content. For example, user selection of a particular looping effect may be received via user interaction with one or more options presented on a user interface. Analysis of the video content to determine the looping effect for the video content may include determining a particular looping effect as the looping effect to be used in generating the looping presentation of the video content based on analysis of the visual content, audio content, metadata, and/or other information relating to the video content. For example, different patterns within the video content may be associated with different looping effects, and a looping effect matching the pattern detected within the video content may be selected for use in generating a looping presentation of the video content. Other determination of looping effect is contemplated.

Figure 4A:
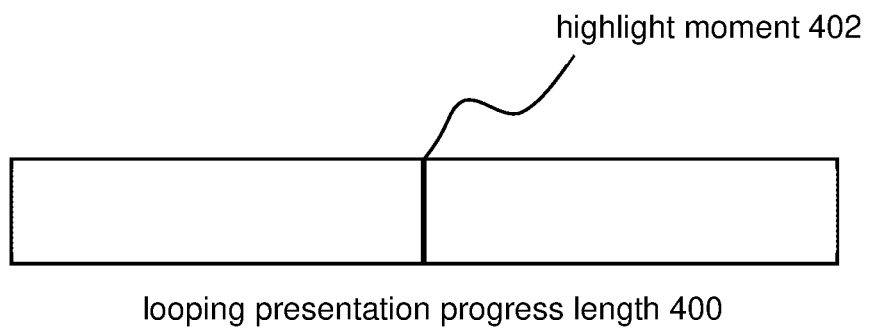
FIGS. 4A and 4B illustrate example locations of a highlight moment within a looping presentation of video content.
Figure 4B:
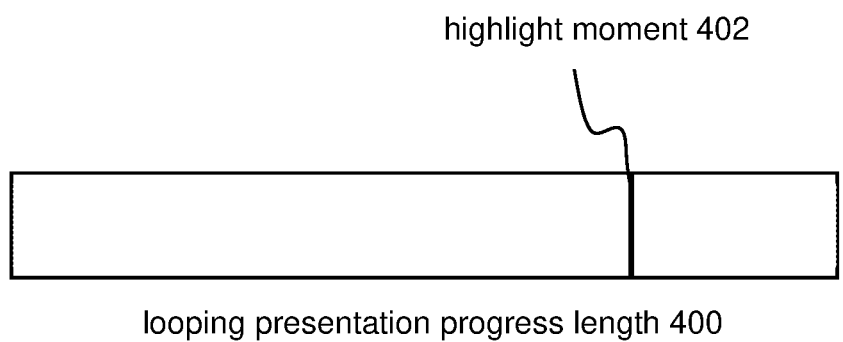

In some implementations, location of the highlight moment within the looping presentation of the video content may be determined based on the looping effect for the video content. The looping effect may specify where the highlight moment should be located within the looping presentation of the video content. FIGS. 4A and 4B illustrate example locations of a highlight moment 402 within a looping presentation of video content. The looping presentation of the video content may have a looping presentation progress length 400. The looping presentation of the video content may include repeats of the looping presentation progress length 400. In FIG. 4A, the highlight moment 402 may be located at the center of the looping presentation progress length 400. Such placement of the highlight moment 402 may result in the highlight moment being presented at the center of the loops. In FIG. 4B, the highlight moment 402 may be located at ¾ point of the looping presentation progress length 400. Such placement of the highlight moment 402 may result in the highlight moment being presented at ¾ of the way through the loops. Other locations of highlight moment within the looping presentation of the video content are contemplated.

In some implementations, the user selection of the highlight moment, the music, and/or the looping effect may be received through user interaction with one or more user interfaces. The user interface may provide one or more options for the user to select the highlight moment, the music, and/or the looping effect. In some implementations, the user interface may provide one or more options for the user to change reference speed that will be used to generate the looping presentation of the video content (e.g., reference speed used by looping effect). In some implementations, the user interface may provide one or more options for the user to change visual and/or audio characteristics of the video content. For example, the user interface may provide one or more options for the user to change color, contrast, exposure, shadows, highlights, and/or vibrance of the visual content in the looping presentation of the video content. In some implementations, the user interface may provide one or more options for the user to export the looping presentation of the video content. In some implementations, the user interface may provide one or more options for the user to select how many loops are to be included in the looping presentation of the video content.

The segment component 110 may be configured to select a segment of the video content to be used for the looping presentation of the video content. A segment of the video content may refer to a portion of the video content. A segment of the video content may refer to a duration of the video content. In some implementations, a segment of the video content may extend a portion of the video progress length of the video content. That is, the segment component 110 may select a shorter duration of the video content for use in looping presentation of the video content. In some implementations, a segment of the video content may extend the entirety of the video progress length of the video content. That is, the segment component 110 may select the entire duration of the video content for use in looping presentation of the video content.

Selecting a segment of the video content may include ascertaining, choosing, determining, establishing, finding, identifying, obtaining, setting, and/or otherwise selecting the segment of the video content. The segment of the video content may be selected based on the music progress length of the music, the highlight moment within the video progress length of the video content, the looping effect for the video content, and/or other information. The music progress length may determine the looping presentation progress length. The music progress length may be used determine how much content (e.g., length of footage) is needed to fill the looping presentation.

The looping effect for the video content may determine how the selected segment is altered/changed within the looping presentation of the video content. The looping effect for the video content may determine how much of the video content is needed to fill the looping presentation progress length. The looping effect for the video content may determine how much of the original footage is needed to generate the altered footage within the looping presentation.

The location of the highlight moment within the video progress length may determine which portion of the video progress length is selected. For example, a looping effect for the video content may require the highlight moment to be placed at center of the looping presentation, and the segment selected from the video content may be centered on the highlight moment. Thus, based on the music progress length, the highlight moment, and the looing effect, the segment of the video content needed to generate the looping presentation may be automatically selected. Other selection of the segment of the video content is contemplated.

Figure 5A:
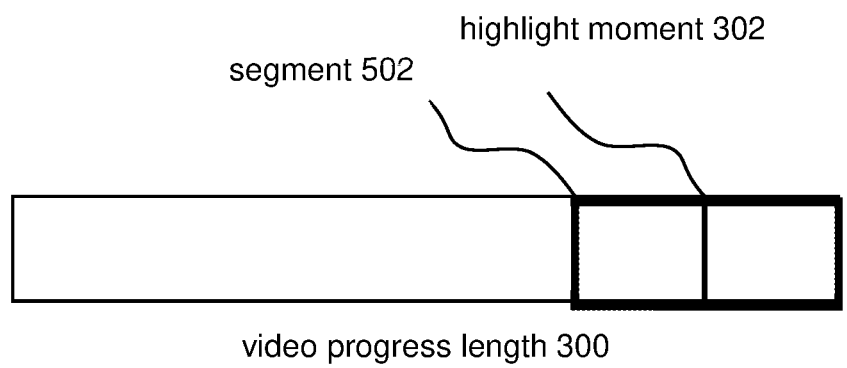
FIGS. 5A and 5B illustrate example segments of the video content selected for use in looping presentation of video content.
Figure 5B:
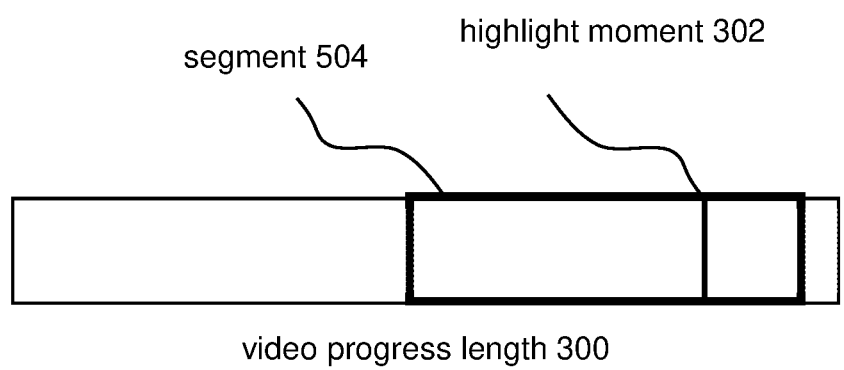

FIGS. 5A and 5B illustrate example segments of the video content selected for use in looping presentation of video content. In FIG. 5A, a segment 502 may be selected. The segment 502 may extend to the end of the video progress length 300. The highlight moment 302 may be centered in the segment 502. In FIG. 5B, a segment 504 may be selected. The segment 504 may not extend to the end of the video progress length 300. The highlight moment 302 may be located ¾ point of the segment 504. Other selection of segments is contemplated.

The generation component 112 may be configured to generate the looping presentation of the video content based on the segment of the video content, the looping effect for the video content, and/or other information. A looping presentation of the video content may refer to repeated playback of the video content, storage of the video content in one or more forms for repeated playback at a later time, and/or other looping presentation of the video content. A looping presentation of video content may be generated by applying the looping effect to the segment of the video content. A looping presentation of the video content may have the music progress length or multiples of the music progress length. For example, the looping presentation may have the same length as the music or multiples (e.g., 2×, 3×) of the length of the music.

A looping presentation of the video content may be generated include the segment of the video content selected by the segment component 110. A looping presentation of the video content may be generated to include the segment edited based on the style of video edit defined by the looping effect. Visual effects (effects that change visual characteristics) and/or temporal effects (effects that change temporal characteristics) of the looping effect may be applied to the segment to generate the visual content of the looping presentation. A looping presentation of the video content may be generated to include accompaniment of the music. The music may provide background sound/soundtrack for presentation of the looping presentation. The music may be used to provide a seamless musical loop, such that the music repeats in the looping presentation without noticeable indication of where identical music elements/pieces have been joined to provide continuous loop. A looping effect may synchronize the visual content to the music (e.g., to the beat of the music). In some implementations, one or more visual transitions may be applied to create seamless loop between beginning and ending of the loop.

In some implementations, the audio content of the selected segment may be included in the looping presentation of the video content. In some implementations, the audio content of the selected segment may be modified based on one or more effects defined by the looping effect.

The looping presentation may be generated regardless of the video progress length. Based on the video progress length being shorter than the music progress length/looping presentation progress length, the looping presentation may be generated to include reverse playback to fill the gap between the amount of available footage and the footage required to fill a loop of the looping presentation.

In some implementations, the looping presentation of the video content may include a reverse playback of one or more portions of the segment of the video content based on location of the highlight moment within the segment. For example, responsive to the highlight moment being within a threshold duration of an end of the segment of the video content, a reverse playback of one or more portions of the segment of the video content may be included in the looping presentation. For instance, if the segments include the highlight moment near the end, the portion near the end of the segment may be played in forward direction and in reverse direction to lengthen the footage. For example, when the end of the segment is reached, the looping presentation may continue by playing back from the end of the segment in reverse.

In some implementations, the looping presentation of the video content may include a reverse playback of one or more portions of the segment of the video content based on length of the segment. For example, responsive to the segment of the video content being shorter than the music progress length/looping presentation progress length, a reverse playback of one or more portions of the segment of the video content may be included in the looping presentation. For instance, if the segment does not include sufficient footage to fill the looping presentation, one or more portions in the segment may be played in forward direction and in reverse direction to lengthen the footage.

In some implementations, the looping presentation of the video content may not include a speed effect (e.g., speed up, slow down, speed ramp) that changes perceived playback speed of the video content based on the segment of the video content being shorter than the music progress length/looping presentation progress length. That is, shortness of the footage may not be address by changing the speed of playback. The speed of playback may be controlled by the looping effect and changing the playback speed to lengthen the footage may interfere with the style of video edit defined by the looping effect. Instead, the looping presentation of the video content may include the speed effect that changes the perceived playback speed of the video content based on the looping effect for the video content. Thus, while the looping effect may cause speed-up/slow-down of the video content within the looping presentation, lack of sufficient footage to fill the looping presentation may not cause changes in playback speed.

A looping presentation of the video content may be generated as encoded video content (e.g., encoded video file) and/or as instructions for presenting the video content. For example, the looping presentation of the video content may be generated as an encoded version of a particular video clip, and the video clip may be opened in a video player for played on the display(s). The looping presentation of the video content may be generated as instructions identifying portion(s) of the video content (e.g., temporal portions, video frames) that are included in the looping presentation, the order in which the portion(s) appear, the effects (e.g., visual effects, temporal effects) to the applied to the portion(s), and the music to accompany the presentation. A video player may use the instructions to retrieve the portion(s) of the video content and the music identified in the instructions for presentation.

In some implementations, the looping presentation of the video content may be encoded to include a selected number of loops. For example, a video clip including the looping presentation may be included to include a particular number of loops. The number of loops that are encoded may be manually selected by a user and/or automatically selected by the processor 11. In some implementations, the number of loops may be selected based on a platform on which the encoded looping presentation of the video content is to be uploaded, and/or other information. A platform may refer to a video sharing platform. A platform may specify limits/recommendation on the length of video content to be uploaded to the platform. For example, a platform may limit upload of video content to 15 seconds or 1 minutes of footage. The number of loops may be selected so that the length of the encoded looping presentation is below the maximum length and/or matches/is close to the recommended length.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
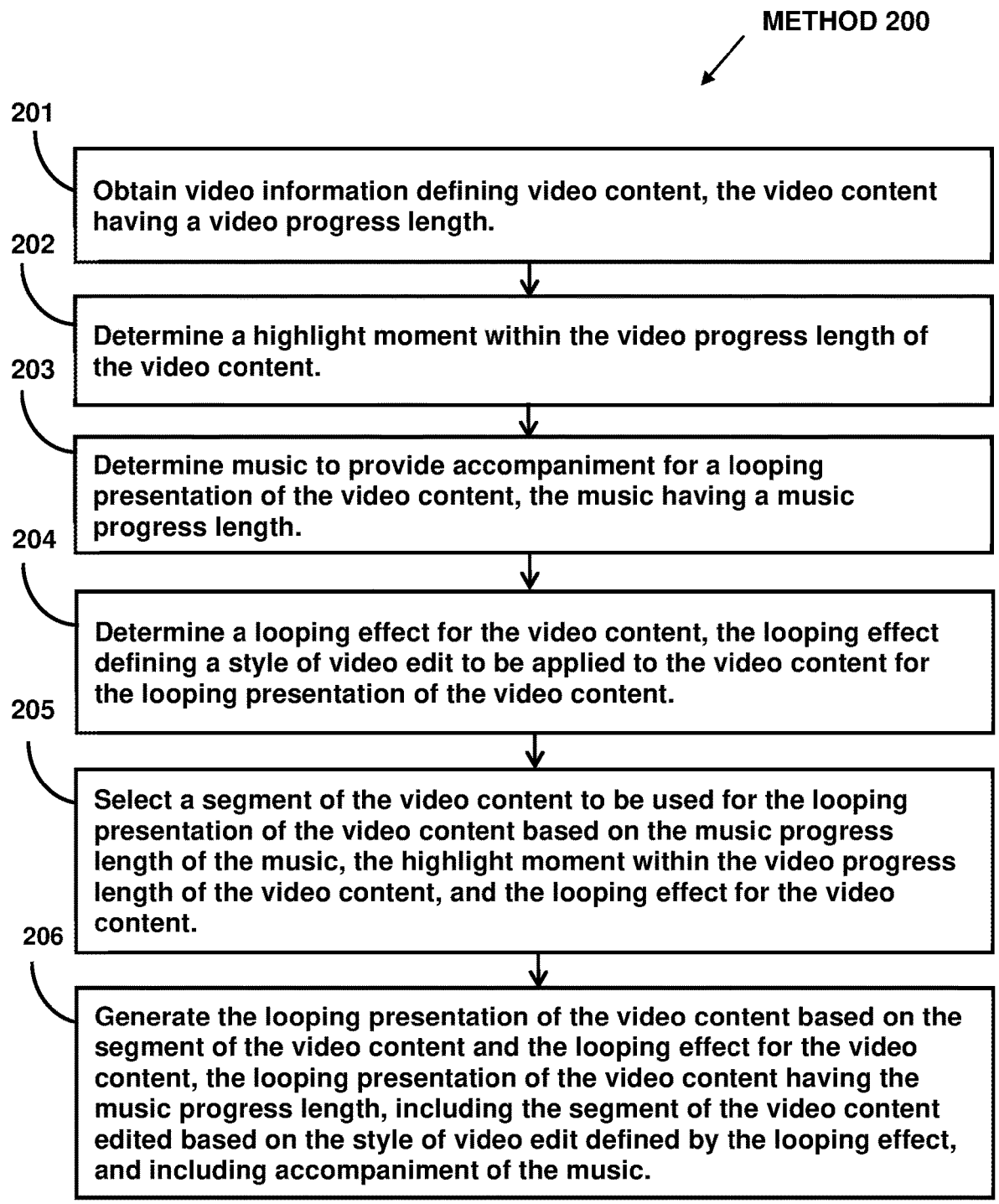
FIG. 2 illustrates a method for generating a looping presentation of video content.

FIG. 2 illustrates method 200 for generating a looping presentation of video content. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video information and/or other information may be obtained. The video information may define video content having a video progress length. In some implementations, operation 201 may be performed by a processor component the same as or similar to the video information component 102 (Shown in FIG. 1 and described herein).

At operation 202, a highlight moment within the video progress length of the video content may be determined. In some implementations, operation 202 may be performed by a processor component the same as or similar to the highlight component 104 (Shown in FIG. 1 and described herein).

At operation 203, music to provide accompaniment for a looping presentation of the video content may be determined. The music may have a music progress length. In some implementations, operation 203 may be performed by a processor component the same as or similar to the music component 106 (Shown in FIG. 1 and described herein).

At operation 204, a looping effect for the video content may be determined. The looping effect may define a style of video edit to be applied to the video content for the looping presentation of the video content. In some implementations, operation 204 may be performed by a processor component the same as or similar to the looping effect component 108 (Shown in FIG. 1 and described herein).

At operation 205, a segment of the video content to be used for the looping presentation of the video content may be selected based on the music progress length of the music, the highlight moment within the video progress length of the video content, the looping effect for the video content, and/or other information. In some implementations, operation 205 may be performed by a processor component the same as or similar to the segment component 110 (Shown in FIG. 1 and described herein).

At operation 206, the looping presentation of the video content may be generated based on the segment of the video content, the looping effect for the video content, and/or other information. The looping presentation of the video content may have the music progress length. The looping presentation of the video content may include the segment of the video content edited based on the style of video edit defined by the looping effect. The looping presentation of the video content may include accompaniment of the music. In some implementations, operation 206 may be performed by a processor component the same as or similar to the generation component 112 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that generates looping videos, the system comprising:
one or more physical processors configured by machine-readable instructions to:
obtain video information defining video content, the video content having a video progress length;
determine a highlight moment within the video progress length of the video content;
determine music to provide accompaniment for a looping presentation of the video content, the music having a music progress length;
determine a looping effect for the video content, the looping effect defining a style of video edit to be applied to the video content for the looping presentation of the video content;
select a segment of the video content to be used for the looping presentation of the video content based on the music progress length of the music, the highlight moment within the video progress length of the video content, and the looping effect for the video content; and
generate the looping presentation of the video content based on the segment of the video content and the looping effect for the video content, the looping presentation of the video content having the music progress length, including the segment of the video content edited based on the style of video edit defined by the looping effect, and including accompaniment of the music, wherein the generation of the looping presentation of the video content includes identification of a position of the highlight moment within the segment of the video content, determination of a duration between the position of the highlight moment within the segment of the video content and an end of the segment of the video content, and, responsive to the duration between the position of the highlight moment within the segment of the video content and the end of the segment of the video content being less than a threshold duration, inclusion of a reverse playback of an ending portion of the segment of the video content in the looping presentation of the video content to lengthen playback footage amount after the highlight moment.

2. The system of claim 1, wherein the highlight moment includes a single highlight point within the video progress length.

3. The system of claim 1, where location of the highlight moment within the looping presentation of the video content is determined based on the looping effect for the video content.

4. The system of claim 1, wherein responsive to the segment of the video content being shorter than the music progress length, the looping presentation of the video content includes a reverse playback of one or more portions of the segment of the video content to address lack of sufficient footage to fill the looping presentation of the video content and excludes a speed effect that slows down perceived playback speed of the video content.

5. The system of claim 4, wherein the looping presentation of the video content includes the speed effect that changes the perceived playback speed of the video content based on the looping effect for the video content.

6. The system of claim 1, wherein the looping presentation of the video content is encoded to include a selected number of loops.

7. The system of claim 6, wherein the number of loops is selected based on a platform on which the encoded looping presentation of the video content is to be uploaded.

8. The system of claim 1, wherein the highlight moment, the music, and/or the looping effect is determined based on user selection.

9. A method for generating looping videos, the method performed by a computing system including one or more processors, the method comprising:
obtaining, by the computing system, video information defining video content, the video content having a video progress length;
determining, by the computing system, a highlight moment within the video progress length of the video content;
determining, by the computing system, music to provide accompaniment for a looping presentation of the video content, the music having a music progress length;
determining, by the computing system, a looping effect for the video content, the looping effect defining a style of video edit to be applied to the video content for the looping presentation of the video content;
selecting, by the computing system, a segment of the video content to be used for the looping presentation of the video content based on the music progress length of the music, the highlight moment within the video progress length of the video content, and the looping effect for the video content; and
generating, by the computing system, the looping presentation of the video content based on the segment of the video content and the looping effect for the video content, the looping presentation of the video content having the music progress length, including the segment of the video content edited based on the style of video edit defined by the looping effect, and including accompaniment of the music, wherein the generating the looping presentation of the video content includes identifying a position of the highlight moment within the segment of the video content, determining a duration between the position of the highlight moment within the segment of the video content and an end of the segment of the video content, and, responsive to the duration between the position of the highlight moment within the segment of the video content and the end of the segment of the video content being less than a threshold duration, including a reverse playback of an ending portion of the segment of the video content in the looping presentation of the video content to lengthen playback footage amount after the highlight moment.

10. The method of claim 9, wherein the highlight moment includes a single highlight point within the video progress length.

11. The method of claim 9, where location of the highlight moment within the looping presentation of the video content is determined based on the looping effect for the video content.

12. The method of claim 9, wherein responsive to the segment of the video content being shorter than the music progress length, the looping presentation of the video content includes a reverse playback of one or more portions of the segment of the video content to address lack of sufficient footage to fill the looping presentation of the video content and excludes a speed effect that slows down perceived playback speed of the video content.

13. The method of claim 12 wherein the looping presentation of the video content includes the speed effect that changes the perceived playback speed of the video content based on the looping effect for the video content.

14. The method of claim 9, wherein the looping presentation of the video content is encoded to include a selected number of loops.

15. The method of claim 14, wherein the number of loops is selected based on a platform on which the encoded looping presentation of the video content is to be uploaded.

16. The method of claim 9, wherein the highlight moment, the music, and/or the looping effect is determined based on user selection.

* * * * *